US008021759B1

(12) United States Patent
Ahlgren et al.

(10) Patent No.: US 8,021,759 B1
(45) Date of Patent: Sep. 20, 2011

(54) HEAT SHRINKABLE FILMS CONTAINING SINGLE SITE CATALYZED COPOLYMERS

(75) Inventors: Kelly R. Ahlgren, Greenville, SC (US); Robert Babrowicz, Spartanburg, SC (US); Solomon Bekele, Taylors, SC (US); Blaine C. Childress, Inman, SC (US); Marvin R. Havens, Greer, SC (US); Vincent W. Herran, Greenville, SC (US); Ronald D. Moffitt, Spartanburg, SC (US); Gautam P. Shah, Simpsonville, SC (US); George D. Wofford, Duncan, SC (US)

(73) Assignee: Cryovac Inc., Duncan, SC (US)

( * ) Notice: Subject to any disclaimer, the term of this patent is extended or adjusted under 35 U.S.C. 154(b) by 841 days.

(21) Appl. No.: 08/996,367

(22) Filed: Dec. 22, 1997

Related U.S. Application Data

(63) Continuation of application No. 08/747,241, filed on Oct. 12, 1996, now abandoned, which is a continuation of application No. 08/418,926, filed on Apr. 7, 1995, now abandoned, which is a continuation of application No. 07/976,122, filed on Nov. 13, 1992, now abandoned.

(51) Int. Cl.
B32B 27/32 (2006.01)
(52) U.S. Cl. .. 428/515; 428/34.9; 428/516; 264/173.15; 264/177.14; 526/348.1; 526/943
(58) Field of Classification Search ............. 428/34.9, 428/35.1, 35.4, 36.7, 36.6, 910, 341, 355 EN, 428/515, 516, 520; 525/240; 526/348.1, 526/348.2, 348.4, 348.5, 348.6; 264/177.14, 264/555, 564, 565, 173.15, 173.13, 173.14, 264/290.2; 156/229, 244.11, 244.13, 244.12
See application file for complete search history.

(56) References Cited

U.S. PATENT DOCUMENTS

| 3,022,543 A | 2/1962 | Baird, Jr., et at |
| 3,161,629 A | 12/1964 | Gorsich ............ 260/94.9 |
| 3,456,044 A | 7/1969 | Pahlke |
| 3,555,604 A | 1/1971 | Pahlke |
| 3,645,992 A | 2/1972 | Elston |
| 3,899,535 A | 8/1975 | Brown et al. |
| 3,900,635 A | 8/1975 | Funderburk, Jr. et al. |
| 3,908,070 A | 9/1975 | Marzolf |
| 4,064,296 A | 12/1977 | Bornstein et al. |
| 4,302,565 A | 11/1981 | Goeke et al. ............ 526/88 |
| 4,302,566 A | 11/1981 | Karol et al. ............ 526/125 |
| 4,306,041 A | 12/1981 | Cozewith et al. ............ 526/65 |
| 4,399,181 A | 8/1983 | Yoshimura et al. |
| 4,424,243 A | 1/1984 | Nishimoto et al. ............ 428/36 |
| 4,429,079 A | 1/1984 | Shibata et al. ............ 525/240 |
| 4,456,646 A | 6/1984 | Nishimoto et al. ............ 428/216 |
| 4,457,960 A | 7/1984 | Newsome ............ 428/35 |
| 4,469,753 A | 9/1984 | Yoshimura et al. |
| 4,500,682 A | 2/1985 | Chiba et al. |
| 4,501,634 A | 2/1985 | Yoshimura et al. ...... 156/244.24 |
| 4,532,189 A * | 7/1985 | Mueller ............ 428/516 |
| 4,540,753 A | 9/1985 | Cozewith et al. ............ 526/88 |
| 4,551,380 A | 11/1985 | Schoenberg ............ 428/218 |
| 4,563,512 A | 1/1986 | Goodall |
| 4,615,922 A | 10/1986 | Newsome et al. |
| 4,640,856 A | 2/1987 | Ferguson et al. ............ 428/36 |
| 4,643,945 A | 2/1987 | Kiang |
| 4,647,483 A | 3/1987 | Tse et al. |
| 4,683,170 A | 7/1987 | Tse et al. |
| 4,701,432 A | 10/1987 | Welborn, Jr. ............ 502/113 |
| 4,755,403 A | 7/1988 | Ferguson |
| 4,777,095 A | 10/1988 | Kondo et al. |
| 4,820,557 A | 4/1989 | Warren |
| 4,833,024 A | 5/1989 | Mueller ............ 428/349 |
| 4,837,084 A | 6/1989 | Warren ............ 428/349 |
| 4,863,768 A | 9/1989 | Ishio et al. |
| 4,863,769 A | 9/1989 | Lustig et al. ............ 428/34.9 |
| 4,865,902 A | 9/1989 | Golike et al. ............ 428/215 |
| 4,871,705 A | 10/1989 | Hoel ............ 502/117 |
| 4,909,881 A | 3/1990 | Garland ............ 156/229 |
| 4,935,397 A | 6/1990 | Chang ............ 502/117 |
| 4,976,898 A | 12/1990 | Lustig et al. ............ 264/22 |
| 4,985,188 A | 1/1991 | Ishio et al. |
| 5,001,016 A | 3/1991 | Kondo et al. ............ 428/516 |
| 5,004,647 A | 4/1991 | Shah |
| 5,023,143 A | 6/1991 | Nelson ............ 428/516 |
| 5,032,463 A | 7/1991 | Smith ............ 428/520 |
| 5,041,316 A | 8/1991 | Parnell et al. |

(Continued)

FOREIGN PATENT DOCUMENTS

AU          676047          2/1997

(Continued)

OTHER PUBLICATIONS

"Exact Linear Ethylene Polymers for Enhanced Sealing Performance", D. Van Der Sanden and R.W. Halle, Antec '92, pp. 154-158.
"A new family of linear ethylene polymers provides enhanced sealing performance", R. W. Halle and D. Van Der Sanden, Feb. 1992, Tappi Journal, pp. 99-103.
"PW Technology Watch", B. Miller, Plastics World, Nov. 1991, p. 29.
"Polyolefins gain higher performance from new catalyst technologies", R. Leaversuch, Modern Plastics, Oct. 1991, pp. 46-49.
"Exxon Cites Breakthrough in Olefins Polymerization", Modern Pastics, Jul. 1991, pp. 61 & 62.
"New Polyolefin Resins Emerge: Branched Linear Copolymers," Modern Plastics International, Nov. 1992, pp. 16-18.

(Continued)

Primary Examiner — D. Lawrence Tarazano
Assistant Examiner — John Freeman
(74) Attorney, Agent, or Firm — Rupert B. Hurley, Jr.

(57) ABSTRACT

The present invention is directed to a heat-shrinkable, thermoplastic film or bag which contains at least one homogeneous ethylene alpha-olefin copolymer having a density of at least 0.90 g/cc. Oriented films made in accordance with the present invention exhibit improved optics and improved impact resistance. A homogeneous ethylene alpha-olefin may be present in a monolayer film either alone or in a blend or may be included in one or more layers of a multilayer film in accordance with the present invention.

56 Claims, No Drawings

U.S. PATENT DOCUMENTS

| | | | | |
|---|---|---|---|---|
| 5,055,328 | A | 10/1991 | Evert et al. | 428/34.9 |
| 5,055,438 | A | 10/1991 | Canich | 502/117 |
| 5,057,475 | A | 10/1991 | Canich et al. | 502/104 |
| 5,059,481 | A | 10/1991 | Lustig et al. | 428/39.9 |
| 5,064,797 | A | 11/1991 | Stricklen | 502/111 |
| 5,064,802 | A | 11/1991 | Stevens et al. | 502/155 |
| 5,084,534 | A | 1/1992 | Welborn, Jr. et al. | 526/160 |
| 5,088,228 | A | 2/1992 | Waldie, Jr | 43/43.12 |
| 5,089,321 | A | 2/1992 | Chum et al. | |
| 5,132,074 | A | 7/1992 | Isozaki et al. | 264/564 |
| 5,132,380 | A | 7/1992 | Stevens et al. | 526/126 |
| 5,145,950 | A | 9/1992 | Funaki et al. | |
| 5,206,075 | A | 4/1993 | Hodgson, Jr. | 428/216 |
| 5,241,031 | A | 8/1993 | Mehta | 526/348.1 |
| 5,256,351 | A | 10/1993 | Lustig et al. | |
| 5,266,392 | A | 11/1993 | Land et al. | 428/224 |
| 5,272,016 | A | 12/1993 | Ralph | 428/516 |
| 5,272,236 | A | 12/1993 | Lai et al. | 526/348.5 |
| 5,278,272 | A | 1/1994 | Lai et al. | 526/348.5 |
| 5,279,872 | A | 1/1994 | Ralph | 428/34.9 |
| 5,283,128 | A | 2/1994 | Wilhoit | 428/516 |
| 5,290,635 | A | 3/1994 | Matsumura et al. | |
| 5,298,326 | A | 3/1994 | Norpoth et al. | |
| 5,302,402 | A | 4/1994 | Dudenhoeffer et al. | 426/129 |
| 5,358,792 | A | 10/1994 | Mehta et al. | |
| 5,374,459 | A | 12/1994 | Mumpower | |
| 5,376,394 | A | 12/1994 | Dudenhoeffer et al. | 426/415 |
| 5,376,439 | A | 12/1994 | Hodgson et al. | 428/220 |
| 5,397,613 | A | 3/1995 | Georgelos | 428/36.7 |
| 5,397,640 | A | 3/1995 | Georgelos et al. | 428/349 |
| 5,403,568 | A * | 4/1995 | Wilhoit | 428/500 |
| 5,427,807 | A | 6/1995 | Chum et al. | 426/393 |
| 5,472,791 | A | 12/1995 | Landoni | 428/516 |
| 5,491,019 | A | 2/1996 | Kuo | 428/213 |
| RE35,285 | E | 6/1996 | Quacquarella et al. | |
| 5,530,065 | A | 6/1996 | Farley et al. | |
| 5,562,958 | A | 10/1996 | Walton et al. | 428/34.9 |
| 5,604,043 | A | 2/1997 | Ahlgren | 428/518 |
| 5,677,383 | A | 10/1997 | Chum et al. | 525/240 |
| 5,707,751 | A | 1/1998 | Garza et al. | |
| 5,834,077 | A | 11/1998 | Babrowicz | |
| 5,837,335 | A | 11/1998 | Babrowicz | |
| 5,852,152 | A | 12/1998 | Walton et al. | |
| 6,074,715 | A | 6/2000 | Lind et al. | |
| 6,270,867 | B1 | 8/2001 | Eckstein et al. | |
| 6,306,969 | B1 | 10/2001 | Patel et al. | |
| 6,437,064 | B1 | 8/2002 | Eckstein et al. | |
| 6,511,568 | B1 | 1/2003 | Eckstein et al. | |
| 6,514,583 | B1 | 2/2003 | Ahlgren et al. | |
| 6,531,198 | B2 | 3/2003 | Lind et al. | |
| 6,544,660 | B1 | 4/2003 | Lind et al. | |
| 2003/0027008 | A1 | 2/2003 | Eckstein et al. | |
| 2004/0009314 | A1 | 1/2004 | Ahlgren et al. | |

FOREIGN PATENT DOCUMENTS

| | | |
|---|---|---|
| AU | 681116 | 8/1997 |
| AU | 87015/98 | 12/1998 |
| AU | 701139 | 1/1999 |
| AU | 714055 | 12/1999 |
| DE | 3035474 A1 | 4/1982 |
| EP | 0 057 238 | 8/1982 |
| EP | 0 057 891 | 8/1982 |
| EP | 0 107 854 B2 | 5/1984 |
| EP | 0 120 503 A1 | 10/1984 |
| EP | 0 051 480 | 1/1985 |
| EP | 0 141 555 A1 | 5/1985 |
| EP | 0 151 462 | 8/1985 |
| EP | 0 227 421 | 12/1986 |
| EP | 0 229 413 A1 | 7/1987 |
| EP | 0 236 099 B2 | 9/1987 |
| EP | 0 170 385 | 2/1988 |
| EP | 0 350 170 B2 | 1/1990 |
| EP | 0 360 491 A2 | 3/1990 |
| EP | 0 397 517 | 11/1990 |
| EP | 0 416 815 | 3/1991 |
| EP | 0 416 848 A1 | 3/1991 |
| EP | 0 447 035 A2 | 9/1991 |
| EP | 0 451 977 A1 | 10/1991 |
| EP | 0 452 920 | 10/1991 |
| EP | 0 461 848 | 12/1991 |
| EP | 0 217 596 B1 | 1/1992 |
| EP | 0 492 656 | 1/1992 |
| EP | 0516019 A2 | 2/1992 |
| EP | 0 495 099 | 7/1992 |
| EP | 0 562 493 | 3/1993 |
| EP | 0 552 911 B1 | 7/1993 |
| EP | 0 562 496 | 9/1993 |
| EP | 0 597 502 | 5/1994 |
| EP | 0 600 425 | 6/1994 |
| EP | 0 662 988 | 7/1995 |
| EP | 0 662 989 | 7/1995 |
| EP | 0 414 202 B1 | 11/1995 |
| EP | 0706455 B1 | 4/1996 |
| EP | 0938521 B1 | 9/1999 |
| FR | 2516017 | 10/1982 |
| GB | 1 209 825 | 10/1970 |
| GB | 2063278 | 6/1981 |
| GB | 2 097 324 | 11/1982 |
| GB | 2124240 A | 2/1984 |
| GB | 2 206 890 | 1/1989 |
| JP | 58-37907 | 6/1983 |
| JP | 58-102762 | 6/1983 |
| JP | 102763/83 | 6/1983 |
| JP | 63-175004 | 4/1988 |
| JP | 1-101315 | 4/1989 |
| JP | 3-26541 | 2/1991 |
| JP | 10-276383 | 10/1998 |
| WO | WO 87/03887 | 7/1987 |
| WO | 87/07880 | 12/1987 |
| WO | 90/03414 | 4/1990 |
| WO | WO 90/03414 | 4/1990 |
| WO | 92/14784 | 9/1992 |
| WO | WO 92/14784 | 9/1992 |
| WO | WO 93/09173 | 1/1993 |
| WO | WO 93/03093 | 2/1993 |
| WO | 93/08221 | 4/1993 |
| WO | WO 93/08221 | 4/1993 |
| WO | WO 93/11940 | 6/1993 |
| WO | WO 93/12151 | 6/1993 |
| WO | 94/06857 | 3/1994 |
| WO | WO 94/06857 | 3/1994 |
| WO | 94/07954 | 4/1994 |
| WO | 94/09060 | 4/1994 |
| WO | WO 94/07954 | 4/1994 |
| WO | WO 94/09060 | 4/1994 |
| WO | 94/18263 | 8/1994 |
| WO | WO 95/00333 | 1/1995 |
| WO | 95/04761 | 2/1995 |
| WO | 93/09173 | 7/1995 |

OTHER PUBLICATIONS

"Enter a New Generation of Polyolefins", Plastics Technology, Nov. 1991, pp. 15-17.
"Novel Rheological Behavior Claimed for New-Tech Polyolefins", Plastics Technology, Nov. 1992, pp. 23 & 25.
"Dow's Patent on Elastic Substantially Linear Olefin Polymers", The Metallocene Monitor, 1993, pp. 2-6.
"Determination of Branching Distributions in Polyethylene and Ethylene Copolymers", Wild et al. Journal of Polymer Science, vol. 20, 1982, pp. 441-455.
"Homogeneous Catalysis, Industrial Applications and Implications", American Chemical Society, 1968, R. Gould, Editor.
"A New Family of Linear Ethylene Polymers with Enhanced Sealing Performance", D. Van Der Sanden, and R.W. Halle, 1991 Polymers Laminations & Coatings Conference, pp. 289-291.
"Ethylene Polymers", Encyclopedia of Polymer Science and Engineering, Second Edition, vol. 6, pp. 420-423, (1985).
"Single Site Metallocene Catalysts Yield Tailor Made Polyolefin Resins", Don Schwank, Modern Plastics International, Aug. 1993, pp. 40 & 41.
RD&E Development Order Form, Film type LDX-3204, (1990).
Duncan Customer Service Form, H.E. Butt Grocery, Product #9W947, (1990).
Feb. 23, 1998, Statement of Grounds and Particulars in Support of Opposition (i.e., of AU 681,116).

Nov. 23, 1998, Declaration of David John Tadgell.
Dec. 10, 1998, Declaration of David Henry Solomon.
Jun. 26, 2008, Amendments—Amending a specification.
Jun. 26, 2008, Proposed Amendments in Australian Patent Application No. 60545/94.
Jul. 23, 1993, Standard Search Report for EP file No. RS 91761DE.
Feb. 17, 1994, European Search Report for EP 93 11 9235.
Dec. 13, 1996, Communication Pursuant to Article 96(2) and Rule 51(2) EPC in EP 93 11 9235.
Response to Official Communication dated Dec. 13, 1994 in EP 93 11 9235.
Dec. 5, 1997, Summons to Attend Oral Hearing in EP 93 11 9235.
Jan. 1, 1998, Preparation of Oral Proceedings.
Feb. 10, 1998, Summons to Attend Oral Proceedings.
Nov. 6, 1998, Response including New Claims (main request first auxiliary request, and second auxiliary request).
Dec. 4, 1998, Invitation Pursuant to Article 96(2) and Rule 51(2) EPC in EP 93 11 9235.
Reply to Official Communication dated Dec. 4, 1998.
Apr. 20, 1999, Communication under Rule 51(4) EPC.
Reply to Official Communication dated Apr. 20, 1999.
Jan. 27, 2000, Decision to Grant a European Patent Pursuant to Article 97(2) EPC.
Dec. 8, 2000, Opposition of EP-B- 0 600 425 by Pechiney Plastic Packaging, Inc.
Dec. 8, 2000, Communication of a Notice of Opposition of EP-B- 0 600 425 by The Dow Chemical Company.
Notice of Opposition of EP-B- 0 600 425 by Dr. Werner Behnisch, Nov. 20, 2000.
Letter from Dr. N. ter Meer regarding patentability of claims filed Dec. 28, 2000.
Proprietor's letter of reply to EPO of Sep. 10, 2001, regarding telephone conversations with examiner, and new claims 1-27.
Jun. 14, 2002, Proprietor's observations on the notices of opposition of Dr. Behnisch, Dow, and Pechiney.
Sep. 22-24, 1992, SPO '92, Table of Contents.
Aug. 4, 2003, Letter from Robin Geary to Duncan Curley.
Pechiney response to Proprietor's comments filed Jun. 14, 2002.
Jun. 28, 2004, Summons to Attend Oral Hearing in EP Application No. 93119235.5.
Nov. 8, 2004, Brief filed by Proprietor in preparation for oral proceedings.
Nov. 8, 2004, Brief filed by Dow in preparation for oral proceedings.
Nov. 29, 2004, Dow filing of pages from dictionary and encyclopedia.
Minutes of Oral Proceedings of Dec. 8, 2004 Plus claims annexes.
Jan. 3, 2005, Decision Revoking EP 0 600 425 B1.
Annexes I-IV accompanying Decision Revoking patent: Annex I: EP 0 600 425; Annex II: Main Request (Set C), Annex III: Auxiliary Request (Set E), Annex IV: $2^{nd}$ Auxiliary Request (Set M).
May 3, 2005, Proprietor's Statement of Grounds for Appeal.
Nov. 25, 2005, Dow's statement of response in reaction to the motivated statement of appeal by Patentee.
Sep. 20, 2005, Pechiney's response to proprietor's statement of grounds for appeal.
Jan. 18, 2006, Response by Dr. Behnisch to Proprietor's statement of grounds of appeal.
Proprietor's Reply to Official Communication dated Mar. 27, 2008 and in preparation for oral proceedings.
May 26, 2008, Minutes of Oral Proceedings of Appeal, and $2^{nd}$ Auxiliary Request (Set M).
C.J. Benning, Plastic Films for Packaging, Technology, Applications, and Economics, 1983, pp. 19-29.
Encyclopedia of Polymer Science and Engineering, vol. 10, Molecular Weight Determination to Pentadiene Polymers, John Wiley & sons, 1987, pp. 619-635 (1987).
Encyclopedia of Polymer Science and Engineering, vol. 7, Fibers, Optical to Hydrogenation, John Wiley & sons, 1987, pp. 88-105 (1987).
W. Graessley, "Effect of Long Branches on the Flow Properties of Polymers", Accounts of Chemical Research, vol. 10, pp. 332-339 (1977).
M.K. Reinking, Equistar Chemicals, LP, Presentation at SPE Polyolefins XII Conference, pp. 259-286.

Jun. 17, 2008, Decision of the Technical Board of Appeal.
Aug. 17, 2010, Communication pursuant to Article 101(1) and Rule 81(2) to (3) EPC.
Apr. 1, 1996, Communication pursuant to Article 96(2) and Rule 51(2) EPC (EP 93118403.0).
Apr. 28, 1994, European Search Report for EP Pat. Appln. No. 93118403.0.
Reply to Official Communication of Apr. 1, 1996.
May 29, 1997, Communication Pursuant to Article 96(2) and rule 51(2) EPC.
Reply to Official Communication dated May 29, 1997.
Apr. 6, 1999, Communication pursuant to Article 96(2) and Rule 51(2) EPC.
Reply to Official Communication dated Apr. 6, 1999.
Jun. 20, 2000, Communication pursuant to Article 96(2) and Rule 51(2) EPC.
Reply to Official Communication dated Jun. 20, 2000.
Sep. 10, 2001, Reply to Telephone Conversations with Examiner.
Nov. 27, 2001, Observations of third parties according to Article 115 EPC.
Oct. 31, 2001, Invitation Pursuant to Article 96(2) and Rule 51(2) EPC.
May 21, 2002, Observations of Third Parties according to Article 115 EPC.
Jun. 21, 2002, Communication under Rule 51(4) EPC.
Oct. 15, 2002, Communication pursuant to Article 96(2) EPC.
Reply to Communication dated Oct. 15, 2002.
Dec. 12, 2003, Communication under Rule 51(4) EPC.
Dec. 16, 2005, Opposition of EP 0 597 502 by Gabriele Ludwig.
U.S. Appl. No. 07/961,269.
B.C. Trudell, et al, "Single Site Catalyzed Ethylene Copolymers: Structure/Property Relationships", *ANTEC 1992*, pp. 613-617.
"First 'single-site-catalyst' PEs Are for medical and cable applications", *Modern Plastics International*, Aug. 1992, p. 48.
"Biaxially Stretched in Comparison with Conventionally Blown Coextruded Composite Plastic Films", *Polymer Engineering and Science*, Mid Feb. 1987, vol. 27, No. 3, pp. 225-231.
Exact Facts, Jun. 1994.
Kuroda, N., et al, "Sequence and Branching Distribution of Ethylene/1-Butene Copolymers Prepared with a Soluble Vanadium-Based Ziegler-Natta Catalyst", *Macromolecules*, vol. 25, No. 11, 1992.
Tominari, K., "Special Applications and markets for Ethylene alpha Olefin Copolymers in Japan", *Specialty Plastics Conference '86*, pp. 301-335 (Nov. 13-15, 1986).
Mar. 2, 2005, Decision to Grant a European Patent Pursuant to Article 97(2) EPC.
Jan. 19, 2006, Communication of a Notice of Opposition.
Nov. 23, 2006, Response to Communication under Rule 57(1).
Nov. 23, 2006, Response to Opposition of EP 0 597 502 by Cryovac, Inc.
Jul. 2, 2007, Summons to Attend Oral Proceedings pursuant to Rule 71(1) EPC.
Jun. 28, 2007, Provision of the minutes in accordance with Rule 76(4) EPC.
Aug. 2, 2007, Written Submissions filed on behalf of Dow, in preparation for Oral Proceedings.
Oct. 2, 2007, Written Submissions filed in Advance of Oral Proceedings for EP 0 597 502.
Nov. 5, 2007, Minutes of the Oral Proceedings before the Opposition Division for EP 0 597 502.
Nov. 5, 2007, Decision Revoking the European Patent EP 0 597 502.
U.S. Appl. No. 07/961,269, filed Oct. 14, 1992, Walton et al.
U.S. Appl. No. 07/955,614, filed Oct. 2, 1992, Garza et al.
Sherman, "Impact: Which Test to Use? Which Instrument to Buy?" Plastics Technology "PTOnline.com", 2001.
Kuroda et al, Sequence and Branching Distribution of Ethylene/1-Butene Copolymers Prepared with a Soluble Vanadium-Based Ziegler-Natta Catalyst, Macromolecules, vol. 25, No. 11 (1992), 8 pages.
Apr. 23, 1993, Office Action in U.S. Appl. No. 07/976,122.
Sep. 23, 1993, Amendment in U.S. Appl. No. 07/976,122.
Dec. 10, 1993, Office Action in U.S. Appl. No. 07/976,122.

Mar. 10, 1994, Amendment under 37 CFR 1.111 in U.S. Appl. No. 07/976,122.
May 31, 1994, Office Action in U.S. Appl. No. 07/976,122.
Nov. 30, 1994, Amendment under 37 CFR 1.116 in U.S. Appl. No. 07/976,122.
Jan. 9, 1995, Notice of Allowability in U.S. Appl. No. 07/976,122.
Jan. 9, 1995, Notice of Allowance and Statement of Reasons for Allowance in U.S. Appl. No. 07/976,122.
May 25, 1995, Notice of Abandonment in U.S. Appl. No. 07/976,122.
Apr. 23, 1993, Office Action in U.S. Appl. No. 07/983,017.
Sep. 23, 1993, Express Abandonment in U.S. Appl. No. 07/983,017.
Oct. 4, 1993, Notice of Abandonment in U.S. Appl. No. 07/983,017.
Apr. 23, 1993, Office Action in U.S. Appl. No. 08/018,657.
Sep. 23, 1993, Amendment in U.S. Appl. No. 08/018,657.
Nov. 30, 1993, Office Action in U.S. Appl. No. 08/018,657.
Feb. 28, 1994, Amendment under 37 CFR 1.111 in U.S. Appl. No. 08/018,657.
May 31, 1994, Office Action in U.S. Appl. No. 08/018,657.
Nov. 30, 1994, Amendment under 37 CFR 1.111 in U.S. Appl. No. 08/018,657.
Feb. 17, 1995, Office Action in U.S. Appl. No. 08/018,657.
Jul. 14, 1995, Response under 37 CFR 1.111 in U.S. Appl. No. 08/018,657.
Nov. 2, 1995, Office Action in U.S. Appl. No. 08/018,657.
Apr. 2, 1996, Amendment under 37 CFR 1.111 in U.S. Appl. No. 08/018,657.
Aug. 15, 1996, Office Action in U.S. Appl. No. 08/018,657.
Dec. 16, 1996, Amendment under 37 CFR 1.111 in U.S. Appl. No. 08/018,657.
Jan. 31, 1997, *Supplemental Amendment under 37 CFR 1.111*.
Jun. 3, 1997, Office Action in U.S. Appl. No. 08/018,657.
Jan. 16, 1998, Notice of Abandonment in U.S. Appl. No. 08/018,657.
Feb. 21, 1996, Office Action in U.S. Appl. No. 08/418,926.
Mar. 12, 1996, Amendment in U.S. Appl. No. 08/418,926.
Jul. 11, 1996, Office Action in U.S. Appl. No. 08/418,926.
Sep. 16, 1996, Office Action in U.S. Appl. No. 08/481,782.
Mar. 17, 1997, Amendment under 37 CFR 1.111 in U.S. Appl. No. 08/481,782.
Mar. 17, 1997, *Declaration under 37 CFR 1.132*.
Jun. 17, 1997, Notice of Allowance in U.S. Appl. No. 08/481,782.
Mar. 9, 1998, Notice of Abandonment in U.S. Appl. No. 08/481,782.
Jun. 25, 1997, Office Action in U.S. Appl. No. 08/747,241.
Mar. 9, 1998, Notice of Abandonment in U.S. Appl. No. 08/747,241.
Feb. 22, 1999, Office Action in U.S. Appl. No. 08/932,946.
Aug. 18, 1999, Amendment under 37 CFR 1.111 in U.S. Appl. No. 08/932,946.
Aug. 18, 1999, Terminal Disclaimer over USPN 5,604,043 in U.S. Appl. No. 08/932,946.
Nov. 1, 1999, Supplemental Amendment under 37 CFR 1.111 in U.S. Appl. No. 08/932,946.
Oct. 28, 1999, *Declaration under 37 CFR 1.132*.
Nov. 9, 1999, Notice of Allowance, Notice of Allowability, Interview Summary, in U.S. Appl. No. 08/932,946.
Mar. 17, 2000, Notice of Abandonment in U.S. Appl. No. 08/932,946.
May 31, 2000, Notice of Recinded Abandonment in U.S. Appl. No. 08/932,946.
Aug. 11, 2000, Office Action in U.S. Appl. No. 08/932,946.
Jan. 11, 2001, Amendment under 37 CFR 1.111 in U.S. Appl. No. 08/932,946.
Oct. 10, 2000, Interview Summary in U.S. Appl. No. 08/932,946.
Apr. 10, 2001, Office Action in U.S. Appl. No. 08/932,946 in U.S. Appl. No. 08/932,946.
Jun. 13, 2001, Preliminary Amendment in U.S. Appl. No. 08/932,946.
Jul. 6, 2001, Notice of Non-Compliant Amendment in U.S. Appl. No. 08/932,946.
Jul. 13, 2001, Corrected Preliminary Amendment in U.S. Appl. No. 08/932,946.
Sep. 27, 2001, Office Action and Interview Summary in U.S. Appl. No. 08/932,946.
Nov. 2, 2001, Amendment under 37 CFR 1.111 in U.S. Appl. No. 08/932,946.
Nov. 2, 2001, *Declaration under 37 CFR 1.132*.

Apr. 4, 2002, Notice of Allowance, Notice of Allowability, Reasons for Allowance in U.S. Appl. No. 08/932,946.
Sep. 9, 2002, Request for Continued Examination in U.S. Appl. No. 08/932,946.
Sep. 9, 2002, Petition under 37 CFR 1.313 in U.S. Appl. No. 08/932,946.
*Decision on Petition of Sep. 9*.
Sep. 25, 2002, Notice of Allowance, Notice of Allowability in U.S. Appl. No. 08/932,946.
May 12, 1999, Office Action in U.S. Appl. No. 08/962,825.
Nov. 11, 1999, Amendment under 37 CFR 1.111 in U.S. Appl. No. 08/962,825.
Nov. 11, 1999, Terminal Disclaimer over U.S. Appl. No. 08/996,367 in U.S. Appl. No. 08/962,825.
Jan. 19, 2000, Interview Summary in U.S. Appl. No. 08/962,825.
Feb. 10, 2000, Supplemental Amendment under 37 CFR 1.111 in U.S. Appl. No. 08/962,825.
Sep. 9&24, 2000, Interview Summary in U.S. Appl. No. 08/962,825.
Feb. 29, 2000, Notice of Allowance, Notice of Allowability in U.S. Appl. No. 08/962,825.
Aug. 3, 2000, Notice of Abandonment in U.S. Appl. No. 08/962,825.
Oct. 3, 2000, Office Action in U.S. Appl. No. 09/583,654.
Mar. 2, 2001, Amendment under 37 CFR 1.111 in U.S. Appl. No. 09/583,654.
Mar. 2, 2001, Terminal Disclaimer over USPN 5,604,043 in U.S. Appl. No. 09/583,654.
Mar. 19, 2001, Notice of Non-Compliant Amendment in U.S. Appl. No. 09/583,654.
May 8, 2001, Notice of Abandonment in U.S. Appl. No. 09/583,654 in U.S. Appl. No. 09/583,654.
May 25, 2001, Petition for Revival of an application for patent unintentionally abandoned under 37 CFR 1.137(b) in U.S. Appl. No. 09/583,654.
May 25, 2001, Amendment under 37 CFR 1.111 in U.S. Appl. No. 09/583,654.
May 25, 2001, Terminal Disclaimer over USPN 5,604,043 in U.S. Appl. No. 09/583,654.
Jul. 23, 2001, Decision on Petition in U.S. Appl. No. 09/583,654.
Oct. 24, 2001, Office Action in U.S. Appl. No. 09/583,654.
Feb. 21, 2002, Notice of Appeal in U.S. Appl. No. 09/583,654.
Jul. 3, 2002, Appeal Brief under 37 CFR 1.192 in U.S. Appl. No. 09/583,654.
Dec. 10, 2002, Office Communication in U.S. Appl. No. 09/583,654.
Mar. 26, 2003, Amendment under 37 CFR 1.111 in U.S. Appl. No. 09/583,654.
Mar. 27, 2003, Interview Summary in U.S. Appl. No. 09/583,654.
Feb. 23, 2006, Office Communication in U.S. Appl. No. 09/583,654.
Feb. 21, 2003, Preliminary Amendment in U.S. Appl. No. 10/370,834.
Mar. 9, 2004, Office Action in U.S. Appl. No. 10/370,834.
Aug. 9, 2004, Terminal Disclaimer over U.S. Appl. No. 09/996,367 in U.S. Appl. No. 10/370,834.
Aug. 9, 2004, Terminal Disclaimer over USPN 6,514,583 in U.S. Appl. No. 10/370,834.
Aug. 9, 2004, Amendment under 37 CFR 1.111 in U.S. Appl. No. 10/370,834.
Nov. 2, 2004, Office Action in U.S. Appl. No. 10/370,834.
Feb. 2, 2005, Terminal Disclaimer over USPN 6,514,583 in U.S. Appl. No. 10/370,834.
Feb. 2, 2005, Response under 37 CFR 1.116 in U.S. Appl. No. 10/370,834.
Feb. 22, 2005, Office Action in U.S. Appl. No. 10/370,834.
Feb. 18, 2005, Examiner-Initiated Interview Summary in U.S. Appl. No. 10/370,834.
Jun. 22, 2005, Petition under 37 CFR 1.182 in U.S. Appl. No. 10/370,834.
Jun. 22, 2005, Amendment under 37 CFR 1.111 in U.S. Appl. No. 10/370,834.
Jun. 22, 2005, Terminal Disclaimer over U.S. Appl. No. 09/996,367 in U.S. Appl. No. 10/370,834.
Aug. 31, 2005, Decision on Petition in U.S. Appl. No. 10/370,834.
Sep. 21, 2005, Office Communication in U.S. Appl. No. 10/370,834.
Jun. 20, 2006, Office Action in U.S. Appl. No. 10/370,834.

Jul. 28, 2006, Amendment under 37 CFR 1.111 in U.S. Appl. No. 10/370,834.
Jan. 23, 2007, Office Action in U.S. Appl. No. 10/370,834.
Jun. 25, 2007, Amendment under 37 CFR in U.S. Appl. No. 10/370,834.
Jun. 25, 2007, Declaration under 37 CFR 1.131 in U.S. Appl. No. 10/370,834.
Feb. 19, 2008, Office Action in U.S. Appl. No. 10/370,834.
Feb 25, 2008, Amendment under 37 CFR 1.116 in U.S. Appl. No. 10/370,834.
Apr. 4, 2008, Notice of Allowance in U.S. Appl. No. 10/370,834.
Aug. 8, 2007, Office Action in U.S. Appl. No. 10/370,834.
Nov. 8, 2007, Amendment under 37 CFR 1.111 in U.S. Appl. No. 10/370,834.
Nov. 8, 2007, Terminal Disclaimer over USPN 6,514,583 in U.S. Appl. No. 10/370,834.
Sep. 22, 2008, Notice of Allowance in U.S. Appl. No. 10/370,834.
Dec. 22, 2008, Request for Continued Examination under 37 CFR 1.114 in U.S. Appl. No. 10/370,834.
Dec. 22, 2008, Supplemental Information Disclosure Statement in U.S. Appl. No. 10/370,834.
Mar. 20, 2009, Notice of Allowance in U.S. Appl. No. 10/370,834.

* cited by examiner

1

HEAT SHRINKABLE FILMS CONTAINING SINGLE SITE CATALYZED COPOLYMERS

This application is a continuation of U.S. Ser. No. 08/747,241, filed 12 Oct. 1996, now abandoned, which is a continuation of U.S. Ser. No. 08/418,926, filed 7 Apr. 1995, now abandoned, which is a continuation of U.S. Ser. No. 07/976,122, filed 13 Nov. 1992, now abandoned.

FIELD OF THE INVENTION

The present invention is generally directed to heat shrinkable films containing single site catalyzed copolymers. The present invention is more particularly directed to heat shrinkable films containing homogeneous ethylene/alpha-olefin copolymers catalyzed by single site catalysts having a density of at least about 0.90 g/cc.

BACKGROUND OF THE INVENTION

Shrinkable thermoplastic films have found many useful applications in packaging of meats, cheeses, poultry and numerous other food and non-food products. There is always the search for improvement in these films to make them have better impact resistance, improved optics and improved ohrinkability. For example, in U.S. Pat. No. 4,640,856 to Ferguson et al., the multilayer thermoplastic heat shrinkable film was described having improved shrink, toughness and barrier properties. The film included at least one layer of a very low density polyethylene and a gas barrier layer of vinylidene chloride copolymer or ethylene vinyl alcohol. The film was found to be particularly useful for making bags for packaging large cuts of fresh red meat.

U.S. Pat. Nos. 5,059,481, 4,976,898 and 4,863,769, all to Lustig et al., disclose heat shrinkable film suitable for packaging food articles such as frozen poultry, primal meat cuts and processed meat products wherein the film may be a biaxially stretched monolayer film of a very low density polyethylene copolymer or a multilayer film containing very low density polyethylene.

U.S. Pat. No. 4,457,960 to Newsome discloses the use of linear low density polyethylene in multiple layer molecularly oriented films.

Each of the foregoing patents describe the incorporation into heat shrinkable films of conventional ethylene/alpha-olefins produced by Ziegler-Natta catalyst systems. Ziegler-Natta catalytic methods are commonly used throughout the polymer industry and have a long history tracing back to about 1957.

These systems are often referred to as heterogeneous since they are composed of many types of catalytic species each at different metal oxidation states and different coordination environments with ligands. Examples of Ziegler-Natta heterogeneous systems include metal halides activated by an organometallic co-catalyst, such as titanium or magnesium chlorides complexed to trialkyl aluminum and may be found in patents such as U.S. Pat. Nos. 4,302,565 and 4,302,566. Because these systems contain more than one catalytic species, they possess polymerization sites with different activities and varying abilities to incorporate comonomer into a polymer chain.

The result of such multi-site chemistry is a product with poor control of the polymer chain architecture both within the sequence of a single chain, as well as when compared to a neighboring chain. In addition, differences in catalyst efficiency produce high molecular weight polymer at some sites and low molecular weight at others. Therefore, copolymers produced using these systems lead to polymer products which are mixtures of chains some high in comonomer and others with almost none. For example, conventional Ziegler-Natta multi-site catalysts may yield a linear ethylene/alpha-olefin copolymer (HDPE, LLDPE, VLDPE, ULDPE) having a mean comonomer percentage of 10, but with a range of 0% to 40% comonomer in individual chains. This, together with the diversity of chain lengths results in a truly heterogeneous mixture also having a broad molecular weight distribution (MWD).

Linear low density polyethylene (LLDPE) has enjoyed great success as a raw material choice for packaging films. The term LLDPE is generally understood to describe copolymers of ethylene and one or more other alpha olefin monomers which are polymerized at low pressure using a Ziegler-Natta catalyst to achieve a density range of about 0.915 to about 0.940. Although no clear standard exists, LLDPE polymers are often marketed in subgroups of densities such as linear medium density (LLDPE), linear low density polyethylene, linear very low density (VLDPE), or linear ultra low density polyethylene (ULDPE). These classifications are for marketing use and will vary by supplier.

These materials are different from high pressure low density polyethylene (LDPE) which is generally understood in the trade as a highly branched homopolymer having a single low melting point. For example, a 0.92 density LDPE would typically have a melting point at about 112° C. while a corresponding density LLDPE would have melting points at 107°, 120°, and 125° C. The multiple melting points are commonly observed with LLDPE and are a consequence of the above mentioned heterogeneous incorporation of comonomer.

Recently a new type of ethylene copolymer has been introduced which is the result of a new catalyst technology. Examples of introductory journal articles include "Exxon Cites 'Breakthrough' in Olefins Polymerization," Modern Plastics, July 1991, p. 61; "Polyolefins Gain Higher Performance from New Catalyst Technologies," Modern Plastics, October 1991, p. 46; "PW Technology Watch," Plastics World, November 1991, p. 29; and "," Plastics Technology, November 1991, p. 15.

These new resins are produced using metallocene catalyst systems, the uniqueness of which resides in the steric and electronic equivalence of each catalyst position. Metallocene catalysts are characterized as having a single, stable chemical type rather than a volatile mixture of states as discussed for conventional Ziegler-Natta. This results in a system composed of catalyst positions which have a singular activity and selectivity. For this reason; metallocene catalyst systems are often referred to as "single site" owing to the homogeneous nature of them, and polymers and copolymers produced from them are often referred to as single site resins by their suppliers.

Generally speaking, metallocene catalysts are organometallic compounds containing one or more cyclopentadienyl ligands attached to metals such as hafnium, titanium, vanadium, or zirconium. A co-catalyst, such as but not limited to, oligomeric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distributions from 1.5 to about 15. The choice of co-catalyst influences the efficiency and thus the production rate, yield, and cost.

Exxon Chemical, in U.S. Pat. No. 4,701,432 sets out examples of which olefin catalyst systems are of the metallocene class and which are non-metallocene. They cite bis (cyclopentadienyl) dichloro-transition metal, bis(cyclopentadienyl)methyl, chloro-transition metal, and bis (cyclopentadienyl) dimethyl-transition metal as examples of metallocene catalysts, where the metals include choices such as titanium, zirconium, hafnium, and vanadium. The patent further provides examples of non-metallocene catalysts as being $TiCl_4$, $TiBr_4$, $Ti(OC_4H_9)_2Cl_2$, $VCl_4$, and $VOCl_3$.

Similarly, C. P. Cheng, at SPO 91, the Specialty Polyolefins Conference sponsored by Schotland and held in Houston, Tex. in 1991, cited $TiCl_3/AlR_2Cl$ and $MgCl_2/TiCl_4/AlR_3$ as examples of non-metallocene Ziegler-Natta catalysts and transition metal cyclopentadienyl complexes as examples of metallocene homogeneous polyolefin catalysts.

As a consequence of the single site system afforded by metallocenes, ethylene/alpha-olefin copolymer resins can be produced with each polymer chain having virtually the same architecture. Therefore, the copolymer chains produced from single site systems are uniform not only in chain length, but also in average comonomer content, and even regularity of comonomer spacing, or incorporation along the chain.

In contrast to the above mentioned Ziegler-Natta polymers, these single site metallocene polymers are characterized as having a narrow MWD and narrow compositional distribution (CD). While conventional polymers have MWD's of about 3.5 to 8.0, metallocenes range in MWD from about 1.5 to about 2.5 and most typically about 2.0. MWD refers to the breadth of the distribution of molecular weights of the polymer chains, and is a value which is obtained by dividing the number-average molecular weight into the weight-average molecular weight. The low CD, or regularity of side branches chains along a single chain and its parity in the distribution and length of all other chains, greatly reduces the low MW and high MW "tails". These features reduce the extractables which arise from poor LMW control as well as improve the optics by removing the linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning calorimeter (DSC) peak melting point peak. Unlike conventional resins which retain a high melting point over a wide density range, metallocene resin melting point is directly related to density. For example, an ethylene/butene copolymer having a density of 0.905 g/cc produced using a metallocene catalyst has a peak melting point of about 100° C., while a slightly lower density ethylene/butene copolymer which was made using a conventional Ziegler catalyst reflects its heterogeneous nature with a melting point at about 120° C. DSC shows that the Ziegler resin is associated with a much wider melting point range and actually melts higher despite its lower density.

In recent years several resin suppliers have been researching and developing metallocene catalyst technology. The following brief discussion should be viewed as representative rather than exhaustive of this active area of the patent literature.

Dow in EP 416,815 disclosed the preparation of ethylene-olefin copolymers using monocyclopentadienylsilane complexed to a transition metal. The homogeneous ethylene copolymers which may be prepared using this catalyst are said to have better optical properties than typical ethylene polymers and be well suited for film or injection molding.

Welborn in Exxon U.S. Pat. No. 4,306,041 discloses the use of metallocene catalysts to produce ethylene copolymers which have narrow molecular weight distributions.

Chang, in Exxon U.S. Pat. No. 5,088,228 discloses the production of ethylene copolymers of 1-propene, 1-butene, 1-hexene, and 1-octene using metallocene catalysts.

Exxon in U.S. Pat. No. 4,935,397 discloses the production of ethylene copolymers using metallocene catalysts to manufacture polymer suitable for injection molding or thermoforming.

Welborn, in Exxon U.S. Pat. No. 5,084,534 discloses the use of bis(n-butylcyclopentadienyl) zirconium dichloride to produce high molecular weight polyethylene having a polydispersity of 1.8 and a density of 0.955 g/cc.

In Exxon U.S. Pat. No. 3,161,629 a cyclopentadienyl complex is disclosed which may be used to produce polyolefins having controlled molecular weight and density suitable for use in extrusion or injection molding.

Canich in Exxon U.S. Pat. Nos. 5,055,438 and 5,057,475 discloses the use of mono-cyclopentadienyl catalysts having a unique silicon bridge which may be employed to select the stereochemical structure of the polymer. Catalysts such as methyl, phenyl, silyl, tetramethylcyclopentadienyl-tertbutylamido-zirconium dichloride may be used to produce polyethylene and ethylene copolymers suitable for films and fibers.

Mitsui Toatsu in JP 63/175004 employed bis (cyclopentadienyl)ethoxy-ZrCl to prepare homogeneous ethylene copolymers.

Mitsubishi in JP 1,101,315 discloses the use of bis (cyclopentadienyl)$ZrCl_2$ for the preparation of ethylene butene copolymers.

It should be noted that at least some previously available ethylene based linear polymers approximated the physical and compositional properties achieved by the present metallocene catalyzed polyolefins. For example, in "Sequence and Branching Distribution of Ethylene/1-Butene Copolymers Prepared with a Soluble Vanadium Based Ziegler-Natta Catalyst," *Macromolecules*, 1992, 25, 2820-2827, it was confirmed that a soluble vanadium-based Ziegler-Natta catalytic system $VOCl_3/Al_2(C_2H_5)_3Cl_3$, acts essentially as a single site catalyst although $VOCl_3$ is not a metallocene. Homogeneous copolymers produced by such a catalyst system have been commercially available for several years. An example of such are the resins sold under the tradename Tafmer™ by Mitsui.

U.S. Pat. No. 4,501,634 to Yoshimura et al is directed to an oriented, multilayered film which includes a Tafiner as a blend component in at least one layer.

Japanese Kokoku 37907/83 to Gunze Limited was directed to a heat-sealable biaxially oriented composite film wherein the heat seal layer contains Tafiner in a blend.

The foregoing patents disclose homogeneous ethylene alpha-olefins having densities below 0.90 g/cc. Heretofore, such resins have been generally unavailable in densities at and above 0.90 g/cc because of limitations in the $VOCl_3$ process. Yet, Canadian Patent 1,209,825 to DuPont discloses homogeneous copolymers having densities up to about 0.920 made with single site Zigler catalysts. When extruded into a film the resins exhibit improved physical and optical properties as compared to films of heterogeneous copolymers. However, such homogeneous copolymers of densities above 0.90 g/cc have been commercially unavailable. It is believed that process limitations precluded the manufacture of such resins in any but bench-top quantities. Metallocene catalysts, however, can provide such homogeneous copolymers in a wide range of densities in commercial quantities. Thus, the processing benefits of homogeneity can now be incorporated into copolymers having densities analogous to those of conventional VLDPEs and LLDPEs. It has been found that in accordance with the present invention that such combination of properties are especially beneficial when these metallocene catalyzed resins are used in the production of heat shrinkable films and bags.

It is therefore an object of the present invention to provide heat-shrinkable, thermoplastic films and bags containing homogeneous copolymers which combine the benefits of homogeneity with the benefits of densities above 0.90 g/cc.

It is a further object of the present invention to provide such thermoplastic heat-shrinkable materials which may be multilayered with each layer serving a function or providing some characteristic to the overall film structure.

SUMMARY OF THE INVENTION

These as well as other objects are achieved by providing a heat-shrinkable film containing a homogeneous single cite catalyzed copolymer of ethylene and an alpha olefin having from 3 to 10 carbon atoms with a copolymer having at least about 0.90 g/cc.

Such objects are further achieved when the single cite catalyzed copolymer is blended with another thermoplastic homopolymer or copolymer.

Moreover, the objects of the present invention are achieved by providing a heat-shrinkable, multilayer film which includes at least a heat sealing layer, an inner layer containing a homogeneous single cite catalyzed copolymer of ethylene and an alpha-olefin having from 3 to 10 carbon atoms with the copolymer having at least about 0.90 g/cc, and a barrier layer.

DETAILED DESCRIPTION OF THE PREFERRED EMBODIMENTS

The present invention is directed to a heat-shrinkable, thermoplastic film or bag containing homogeneous copolymers of ethylene and at least one other alpha-olefin. The term "copolymer" as used herein is intended to denote polymers of two or more comonomers. Therefore, although the present specification generally discusses ethylene alpha-olefin copolymers such term is intended to encompass copolymers of ethylene with one or more alpha-olefins or ethylene with an alpha-olefin and another comonomer.

The term "oriented" is used herein interchangeably with the term "heat shrinkable," these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

The heat shrinkable film of the present invention is preferably oriented and is formed by extrusion processes especially art-known coextrusion methods. It is initially cooled to a solid state by, for example, cascading water or chilled air quenching, after which it is reheated to within its orientation temperature range and oriented by stretching. The stretching to orient may be accomplished in many ways such as, for example, by "blown bubble" techniques or "tenter framing." These processes are well known to those skilled in the art and refer to orientation procedures whereby the material is heated to its softening temperature and then stretched in the cross or transverse direction (TD) and/or in the longitudinal or machine direction (MD). After being heated and stretched, the film is quickly quenched while substantially retaining its stretched dimensions to cool the film rapidly and thus set or lock in the oriented molecular configuration.

The film layers may be formed by coextrusion, with additional layers thereafter being extrusion coated thereon to form multilayer films. Two multilayer tubes may also be formed with one of the tubes thereafter being extrusion coated or laminated onto the other. The extrusion coating method of film formation is preferable to coextruding the entire film when it is desired to subject one or more layers of the film to a treatment which may be harmful to one or more of the other layers. This may be done where it is desired to irradiate one or more layers of a film with high energy electrons where the film contains a barrier layer of one or more copolymers of vinylidene chloride (e.g., Saran™), such as vinylidene chloride and vinyl chloride or vinylidene chloride and methyl acrylate as well as vinylidene chloride with ethyl acrylate or acrylonitrile.

Films of this type would, for example, comprise those where the barrier layer is a Saran™ layer in addition to or instead of an EVOH layer. Those skilled in the art generally recognize that irradiation with high energy electrons is generally harmful to such Saran™ barrier layer compositions, as irradiation may degrade and discolor Saran™, making it turn brown. Thus, if full coextrusion followed by high energy electron irradiation of the multilayer structure is carried out on a film having a barrier layer containing a Saran™ layer, the irradiation should be conducted at low levels and with care. Alternatively, this may be avoided by extruding a first layer or layers, subjecting the layer or layers to high energy electron irradiation and thereafter applying the Saran™ barrier layer and, for that matter, other layers (which may or may not have been irradiated) sequentially onto the outer surface of the extruded, previously irradiated, tube. This sequence allows for high energy electron irradiation of the first layer or layers without subjecting the Saran™ barrier layer to harmful discoloration.

Thus, as used herein the term "extrusion" or the term "extruding" is intended to include coextrusion, extrusion coating, or combinations thereof.

As noted, the present heat shrinkable film may optionally be subjected to an energetic radiation treatment, including, but not limited to corona discharge, plasma, flame, ultraviolet, and high energy electron treatment. Irradiation is most preferably performed prior to orientation and, in the case of a Saran-containing barrier structure, prior to extrusion coating of the barrier component. Radiation dosages are referred to herein in terms of the radiation unit "RAD," with one million RADS or a megarad being designated as "MR." A suitable radiation dosage of high energy electrons is in the range of up to about 12 MR, more preferably about 2 to about 9 MR. However, irradiation after orientation, regardless of structure, and performed at lower dosage levels, is also within the scope of the present invention.

For those embodiments in which the present heat shrinkable film is a multilayer film, each layer will generally serve some function or provide some characteristic to the overall structure. Seal layer composition will be chosen for ease of heat sealing and, depending on the intended end use application, other factors such as grease resistance may be of importance. Outer layer composition may be chosen for abuse resistance or, where a given end use application requires a folded over "lap" seal, sealability to the seal layer. If a barrier layer is required it will be chosen for the degree of gas or moisture impermeability needed for the ultimate product to be packaged. Further internal layers may serve to add bulk to the film, promote shrinkability, promote interlayer adhesion or any combination of these properties.

In a heat shrinkable multilayer film in accordance with the present invention, the homogeneous copolymer may be present in an outer layer, a heat sealing layer, or an inner layer.

The following examples are representative of the preferred embodiments of the present heat shrinkable films containing homogeneous linear ethylene alpha-olefin copolymers. In order to evaluate such films the following tests were employed:

Tensile Strength: A measure of the force required under constant elongation to break a specimen of the film; measured by ASTM D 882.

Elongation: A measure of the percent extension required to break a specimen of the film; measured by ASTM D 882.

Modulus: The ratio of the change in force to the change in elongation in the straight line portion of an Instron Tensile Testing curve; measured by ASTM D 882—Method A.

Tear Propagation: The force required to propagate a tear from a tiny slit made by a sharp blade in a specimen of the film; measured by ASTM D 1938.

Free Shrink: The percent dimensional change in a 10 cm.×10 cm. specimen of film when subjected to a selected heat; measured by ASTM D 2732.

Ball Burst: The energy necessary to burst and penetrate a restrained specimen of film; measured by ASTM D 3420.

Instrumented Impact: The energy necessary to puncture a restrained specimen of film, similar to ball burst, defined above. However, the Instrumented Impact Tester has the ability to measure the tensile/elongation curve to break. The "gradient" is the ratio of the change in force to change in elongation in the straight line portion of the curve. "Peak" is a measure of the maximum force exerted on the specimen to impart rupture. "Impact Energy" is a measure of the energy absorbed by the sample prior to rupture. Instrumented Impact is measured by ASTM D 3763.

Haze: The percentage of transmitted light which is scattered forward while passing through a specimen; measured by ASTM D 1003—Method A.

Clarity: A measure of the distortion of an image viewed through a specimen; measured by ASTM D 1746.

Gloss: The surface reflectance or shine of a specimen; measured by ASTM D 2457.

Parallel Plate: A bag is confined between two plates a specified distance apart and is inflated until its seal fails. The pressure level inside the bag at the point of failure is a measure of seal quality. Results are reported in inches of water pressure (IOWP).

LRHB (Linear Ramped Hot Burst): A clean sealed bag is inflated to a specified dwell pressure and the seal area is submerged in hot water at 182 F. After five seconds the pressure inside the bag is increased at the rate of 2 inches of water/second. The time to failure and burst pressure is a measure of seal quality. Test results are reported in seconds and inches of water pressure (IOWP).

LRHB-G (Linear Ramped Hot Burst—Grease): The procedure is the same as the LRHB test described above except peanut oil is first applied to the seal area.

VPHB (Variable Pressure Hot Burst): As with the LRHB test described above, a clean sealed bag is inflated to a specified dwell pressure and the seal area is submerged in hot water at 182 F. After five seconds the pressure inside the bag is increased at a specified rate ranging 1 to 7 inches of water/second. Here again, test results are reported as seconds and inches of water pressure (IOWP).

VPHB-G (Variable Pressure Hot Burst—Grease): The procedure is the same as the VPHB test described above except peanut oil is first applied to the seal area.

Gel: A measure of the relative amount of ultra high molecular weight polymer present in a sample. A gel measurement can provide an indication of the level of crosslinking which is present in a sample since the amount of polymer which is collected as gel increases with crosslinking. Gel is determined by solvent extraction with boiling toluene. In this method a specimen weighting 0.4 grams is extracted for 21 hours in a cellulose thimble, removed, dried and reweighed. The percentage of gel is calculated by ratioing the polymer remaining (toluene insoluble fraction) to the original weight. However, a gel value of 0% cannot reliably indicate that no crosslinking has occurred. Rather, the level of crosslinking may not be great enough to provide measurable gel.

DSC: The differential scanning calorimeter (DSC) is an instrument which measures the heat flow to a polymer sample during the programmed heating of it at 10 C. per minute. The trace obtained from the DSC can be used to characterize a sample's starting and ending melting point as well as its peak melting point(s).

Polydispersity (Mw/Mn): A measure of the uniformity of chain lengths within a polymer sample. It defines the breadth of molecular weight distribution. It is obtained by dividing the weight average molecular weight (Mw) by the number average molecular weight (Mn). The Mw and Mn are determined by Gel Permeation Liquid Chromatography.

Example 1

Approximately 30 ml of resin pellets of Exxon SLP 3010A, a 0.910 density homogeneous ethylene butene copolymer having a 1.0 melt index were placed in the center of the mylar sheets of a press assembly, as described above. The assembly was held at 320° F. for 1 minute without applied pressure. At 30 and 45 seconds the top press plate was lowered as close as possible without applying pressure. The pressure was then increased to 500 psi and was maintained for 1 minute. The mylar sheets with the platen sandwiched therebetween were removed from the hot steel plates to allow the plates to cool to ambient temperature. The thickness of the platen was measured at several sites and ranged from 15-18 mils.

The platen was then oriented on the T.M. Long Stretcher laboratory orientation unit at the University of Tennessee, Knoxville, Tenn. The orientation conditions were as follows: air temperature=95° C.; dwell time=10 sec.; stretch ratio=3.5×3.5; strain ratio=2000%; plate temperature=120° C. The final film thickness was approximately 1 mil.

Example 2

A sample of Exxon SLP 3011D, a 0.902 density homogeneous ethylene hexene copolymer having a 1.0 melt index was formed into a film and oriented in accordance with the procedures set forth in Example 1. The orientation conditions were as follows: air temperature=88° C.; dwell time=15 sec.; stretch ratio=3.5×3.5; strain ratio=2000%; plate temperature=105° C. The final film thickness was approximately 1 mil.

Example 3

A second sample of Exxon SLP 3011D was formed into a film and oriented in accordance with the procedures set forth in Example 1. The orientation conditions were as follows: air temperature=78° C.; dwell time=20 sec.; stretch ratio=3.5×3.5; strain ratio=2000%; plate temperature=95° C. The final film thickness was approximately 1 mil.

Example 4

A third sample of Exxon SLP 3011D was formed into a film and oriented in accordance with the procedures set forth in Example 1. The orientation conditions were as follows: air temperature=78° C.; dwell time=30 sec.; stretch ratio=3.5× 3.5; strain ratio=2000%; plate temperature=95° C. The final film thickness was approximately 1 mil.

Example 5

Prior Art

A sample of Dowlex 2045 from Dow, a heterogeneous ethylene octene copolymer having a density of 0.920, was made into a film and oriented in accordance with the procedures set forth in Example 1 for comparative purposes. The orientation conditions were as follows: air temperature=105° C.; dwell time=30 sec.; stretch ratio=3.5×3.5; strain ratio=4000%; plate temperature=105° C. The resultant oriented film had a thickness of approximately 1 mil.

Example 6

Two platens made from Fina 8473, an ethylene propylene copolymer (EPC) with 3.1% by weight ethylene were pressed in accordance with the film formation process set forth in Example 1. A third platen formed of Exxon SLP 3011A, a homogeneous ethylene hexene copolymer having a density of 0.910 g/cc and a 1.0 M.I. made by the process of Example 1 was placed between the two EPC platens. The three layers were then pressed under heat and pressure to weld the three into a single multilayer film.

The multilayer film was then oriented on the T.M. Long-stretcher laboratory orientation unit at the University of Tennessee, Knoxville, Tenn. The orientation conditions were as follows: air temperature=105° C.; dwell time=30 sec.; stretch ratio=4.0×4.0; strain ratio=3900%; plate temperature=105° C. The final film thickness was approximately 1 mil.

Example 7

As set forth in Example 6 above, a multilayer film was produced by pressing a platen of Exxon SLP 3011D (made by the process of Example 1) between two platens of ethylene propylene copolymer.

The film was oriented under the following conditions: air temperature=100° C.; dwell time=30 sec.; stretch ratio=4.0× 4.0; strain ratio=3900%; plate temperature=100° C. The final film thickness was approximately 1 mil.

Example 8

Prior Art

As set forth in Example 7 above, a multilayer film was produced by pressing a platen of Dowlex 2045 between two platens of ethylene propylene copolymer for comparative purposes.

The film was oriented under the following condition: air temperature=114.5° C.; dwell time=30 sec.; stretch ratio=4.0×4.0; strain ratio=3900%; plate temperature=115° C. The final film thickness was approximately 1 mil.

Example 9

Several physical properties of the oriented monolayer film samples of Example 1-5 were evaluated and are given below in Table 1. The film of Example 5 is representative of the prior art and is given for comparative purposes.

TABLE 1

| Property/ | Film of | | | | |
| --- | --- | --- | --- | --- | --- |
|  | Ex. 1 | Ex. 2 | Ex. 3 | Ex. 4 | Ex. 5 |
| Tensile, psi | 15,300 | 22,917 | 19,088 | 18,822 | 13,500 |
| Elongation, % | 142 | 160 | 201 | 175 | 181 |
| Modulus, psi | 27,000 | 16,504 | 13,502 | 14,912 | 46,000 |
| Tear Propogation grams | 88 | 10 | 87 | 54 | 110 |
| Free Shrink, % (at 200° F.) | 13/10 | 43/38 | 50/48 | 55/53 | 3/6 |
| Ball Burst cm-kg | 11.0 | 45 | 50+ | 50+ | 5.3 |
| Instrumented Impact | 15.0 | 31 | 65 | 60 | 5.0 |
| Haze, % | 5.9 | 0.5 | 1.0 | 1.4 | 2.7 |
| Clarity, % | 44 | 89 | 81 | 83 | 80 |
| Gloss, 45 deg. | 65 | 95 | 89 | 88 | 77 |

The numbers shown for tear propogation for each film are subject to a very high standard deviation.

Example 10

As in Example 9 above, several physical properties of the oriented multilayer film samples of Examples 6-8 were evaluated and are given in Table II below. The film of Example 8 is representative of the prior art and is given for comparative purposes.

TABLE II

| Property/ | Film of | | |
| --- | --- | --- | --- |
|  | Ex. 6 | Ex. 7 | Ex. 8 |
| Tensile, psi | 9100 | 7027 | 8000 |
| Elongation, % | 77 | 82 | 91 |
| Modulus, psi | 85,800 | 66,623 | 75,000 |
| Tear Propogation grams | 4.5 | 5 | 15.8 |
| Free Shrink, % | 7-6 | 11-13 | 3-2 |
| Ball Burst cm-kg | 5 | 6 | 4 |
| Instrumented Impact | 10 | 7 | 8 |
| Haze, % | 1.1 | 1.5 | 2.2 |
| Clarity, % | 85 | 35 | 24 |
| Gloss, 45 deg. | 89 | 84 | 85 |

Example 11

A three layer coextruded precursor film having the structure inner layer/core layer/outermost adhesive layer was formed. The inner layer was Elvax 3128 from DuPont, an ethylene vinyl acetate with 8.9% vinyl acetate (EVA-1); the core layer was Exxon SLP 3011D; and the outermost layer was Escorene LD-720.92 from Exxon, an ethylene vinyl acetate having 19% vinyl acetate (EVA-2). The precursor film was irradiated to 2 MR and thereafter extrusion coated with a barrier layer of a vinylidene chloride methyl acrylate from Dow and an outer abuse layer of LD 318.92 from Exxon, an ethylene vinyl acetate with 9% VA (EVA-3) to yield a resultant five layer film having the basic structure:

EVA-1/core/EVA-2/barrier/EVA-3

The five layer film was then oriented by a trapped bubble method out of hot water with both the preheat and hot bath temperatures at 195° F.

Examples 12-22

The procedure set forth in Example 11 was repeated eleven times, each time resulting in the basic structure:

EVA-1/core/EVA-2/Saran MA/EVA-3

Table III, below, outlines the variations in irradiation dosage, orientation preheat and hot bath temperatures and core layer composition. Example 19-22 are representative of the prior art and are shown for comparative purposes.

TABLE III

| Example | Dose | Preheat | Hotbath | Core |
|---|---|---|---|---|
| 11 | 2MR | 195 | 195 | SLP 3011D |
| 12 | 4MR | 195 | 195 | SLP 3011D |
| 13 | 2MR | 210 | 210 | SLP 3011D |
| 14 | 4MR | 210 | 210 | SLP 3011D |
| 15 | 2MR | 195 | 195 | SLP 3011B |
| 16 | 4MR | 195 | 195 | SLP 3011B |
| 17 | 2MR | 210 | 210 | SLP 3011B |
| 18 | 4MR | 210 | 210 | SLP 3011B |
| 19 | 2MR | 195 | 195 | Attane 4203 |
| 20 | 4MR | 195 | 195 | Attane 4203 |
| 21 | 2MR | 210 | 210 | Attane 4203 |
| 22 | 4MR | 210 | 210 | Attane 4203 |

Exxon SLP 3011B is a homogeneous ethylene hexene copolymer having a density of 0.905 g/cc and a 2.1 M.I. Attane 4203 is a heterogeneous ethylene octene copolymer having a density of 0.905 g/cc.

The oriented multilayer films of Examples 11-22 were tested for free shrink and instrumented impact with the results given below in Table IV. It may be seen that when comparing the metallocene resin films of Examples 11 and 15 or 12 and 16 with the comparative example counterparts of 19 and 20, a substantial improvement in impact resistance is seen. Similarly, a comparison of Examples 13 and 17 or 14 and 18 with their respective comparative heterogeneous Examples 21 and 22 show an improved impact for the metallocene resins.

TABLE IV

| | | | Instrumented Impact | | |
|---|---|---|---|---|---|
| | Free Shrink | | Peak | Grad | Energy |
| Ex. # | L | T | lbs. | lb/in. | ft.lb |
| 11 | 31 | 45 | 86.8 | 56.9 | 5.97 |
| 12 | 31 | 45 | 86.0 | 55.2 | 6.06 |
| 13 | 14 | 34 | 37.1 | 33.2 | 1.96 |
| 14 | 17 | 34 | 46.4 | 33.5 | 2.74 |
| 15 | 30 | 41 | 77.4 | 53.5 | 5.34 |
| 16 | 30 | 42 | 71.9 | 51.6 | 4.12 |
| 17 | 17 | 35 | 43.5 | 37.2 | 2.73 |
| 18 | 18 | 34 | 56.4 | 37.9 | 4.17 |
| 19 | 30 | 45 | 54.2 | 46.0 | 2.91 |
| 20 | 30 | 45 | 55.1 | 49.4 | 2.63 |
| 21 | 20 | 37 | 40.9 | 37.6 | 1.95 |
| 22 | 21 | 38 | 46.1 | 40.8 | 2.20 |

Example 23

A two layer coextruded precursor film was formed having an inner layer of Exxon SLP-1-277, as homogeneous ethylene butene copolymer having a density of 0.900 g/cc and a 2.0 M.I. and a second layer of Excorene LD-720.92 from Exxon, EVA-1.

Following irradiation the precursor film was extrusion coated with a barrier layer of a vinylidene chloride methyl acrylate supplied by Dow and an outer layer of LD 318-92 from Exxon, EVA-2. Thereafter the total structure was oriented out of hot water by a trapped bubble technique. The final film structure and target percent thickness per layer was:

| SLP-1-277/ | EVA-1/ | /Saran | /EVA-2 |
|---|---|---|---|
| 14.71% | 50.84% | 9.24% | 25.21% |

Example 24

The procedure set forth in Example 23 was repeated with the exception that the inner layer of the precursor film was Exxon SLP-1-291, a homogeneous ethylene butene copolymer having a density of 0.904 g/cc and a 2.5 M.I.

Example 25

The procedure set forth in Example 23 was repeated with the exception that the inner layer of the precursor film was Exxon SLP-1-342, a homogeneous ethylene hexene copolymer having a density of 0.905 g/cc and a 1.5 M.I.

Example 26

For comparative purposes the procedure set forth in Example 23 was repeated with the exception that the inner layer of the precursor film was a blend of 90% by weight of NA 295-000 an ethylene vinyl acetate copolymer having 6.7% vinyl acetate supplied by Quantum, and 10% by weight of Dowlex 2045, a heterogeneous ethylene octene copolymer having a density of 0.920 g/cc, supplied by Dow. Such blend in a heat sealing layer is representative of the prior art.

Examples 27-38

The film tubing produced in each of Examples 23-26 was converted to eight inch side seal bags with the side seal machine running at 100 bags/minute at 6.0, 7.5 and 9.0 amps, respectively. Only very weak seals could be formed for each structure below 6.0 amps and sealing above 9.0 amps was precluded by puckering.

The samples were subjected to parallel plate, VPHB and VPHB-G tests. The results are shown in Table V below.

TABLE V

| Ex. # | Film of | Amps | Parallel Plate | VPHB | VPHB-G |
|---|---|---|---|---|---|
| 27 | 23 | 6.0 | 123.3 | 7.4 | 4.6 |
| 28 | 23 | 7.5 | 120.8 | 13.4 | 10.7 |
| 29 | 23 | 9.0 | 144.8 | 13.3 | 12.6 |
| 30 | 24 | 6.0 | 138.6 | 0 | 7.6 |
| 31 | 24 | 7.5 | 143.4 | 14.1 | 10.7 |
| 32 | 24 | 9.0 | 140.9 | 15.5 | 13.2 |
| 33 | 25 | 6.0 | 138.0 | 24.5 | 22.9 |
| 34 | 25 | 7.5 | 148.0 | 31.1 | 32.6 |
| 35 | 25 | 9.0 | 147.7 | 33.1 | 33.4 |
| 36 | 26 | 6.0 | 146.9 | 20.4 | 14.5 |
| 37 | 26 | 7.5 | 145.9 | 21.7 | 19.7 |
| 38 | 26 | 9.0 | 159.0 | 23.4 | 22.9 |

Example 39

A two layer coextruded precursor film was formed having an inner layer of Exxon SLP 9017 a homogeneous ethylene hexene copolymer having a density of 0.920 g/cc and a 3.0 M.I. and an outermost layer of Excorene LD 720.92 from Exxon, EVA-1.

Following irradiation the precursor film was extrusion coated with a first barrier layer of a vinylidene chloride methyl acrylate supplied by Dow, a second layer of EVA-1 and an abuse layer of LD 318.92 from Exxon, EVA-2. The film structure was then oriented out of hot water by a trapped bubble technique. The final overall structure and target percent thickness per layer was:

| SLP 9017/ | EVA-1/ | /Saran | /EVA-1 | /EVA-2 |
|---|---|---|---|---|
| 14.58% | 50.42% | 10% | 12.5% | 12.5% |

Example 40

The procedure set forth in Example 39 was repeated with the exception that the inner layer of the precursor film was formed of a blend of 90% by weight of Exxon SLP 9017 and 10% by weight of Exxon SLP 4008, a homogeneous ethylene hexene copolymer having a density of 0.885 g/cc and a 4 M.I.

Example 41

The procedure set forth in Example 39 was repeated with the exception that the inner layer of the precursor film was formed of a blend of 80% by weight of Exxon SLP 9017 and 20% by weight Exxon SLP 4008.

Example 42

The procedure set forth in Example 39 was repeated with the exception that the inner layer of the precursor film was formed of a blend of 70% by weight of Exxon SLP 9017 and 30% by weight of Exxon SLP 4008.

Example 43

The procedure set forth in Example 39 was repeated with the exception that the inner layer of the precursor film was formed of a blend of 60% by weight of Exxon SLP 9017 and 40% by weight of Exxon SLP 4008.

Example 44

The procedure set forth in Example 39 was repeated with the exception that the inner layer of the precursor film was formed of a blend of 90% by weight of Dowlex 2045 and 10% by weight of Exxon SLP 9013, a homogeneous ethylene hexene copolymer having a density of 0.898 g/cc and a 3.2 M.I.

Example 45

The procedure set forth in Example 39 was repeated with the exception that the inner layer of the precursor film was formed of a blend of 80% by weight of Dowlex 2045 and 20% by weight of Exxon SLP 9013.

Example 46

The procedure set forth in Example 39 was repeated with the exception that the inner layer of the precursor was formed of a blend of 70% by weight of Dowlex 2045 and 30% by weight of Exxon SLP 9013.

Example 47

The procedure set forth in Example 39 was repeated with the exception that the inner layer of the precursor film was formed of a blend of 60% by weight of Dowlex 2045 and 40% by weight of Exxon SLP 9013.

Examples 48-57

The films of Examples 39-47 and Example 26 were formed into side seal bags and were subjected to parallel plate, LRHB-G (linear ramped hot burst grease) and VPHB-G tests. Results for all three tests for each sample are given in Table VI below.

Example 57 represents test results for the film of Example 26, the closest available prior art structure.

TABLE VI

| EX # | FILM OF EX. # | PP IOWP | LRHB-G SEC | LRHB-G IOWP | LPHB-G SEC | LPHB-G IOWP |
|---|---|---|---|---|---|---|
| 48 | 39 | 172 | 21 | 44 | 44 | 45 |
| 49 | 40 | 168 | 20 | 41 | 43 | 45 |
| 50 | 41 | 152 | 18 | 38 | 44 | 40 |
| 51 | 42 | 142 | 17 | 36 | 42 | 39 |
| 52 | 43 | 138 | 17 | 35 | 49 | 49 |
| 53 | 44 | 130 | 17 | 35 | 35 | 37 |
| 54 | 45 | 136 | 18 | 37 | 42 | 38 |
| 55 | 46 | 151 | 19 | 38 | 49 | 41 |
| 56 | 47 | 146 | 19 | 38 | 56 | 38 |
| 57 | 26 | 145 | 16 | 30 | 28 | 33 |

Examples 58-61

Four monolayer platens were pressed from samples of Exxon SLP 3011A, a homogeneous ethylene hexene copolymer having a density of 0.910 and a 1.0 M.I. substantially as described by the film forming process of Example 1 above. One platen was not irradiated while the other three were irradiated to dosages of 3 MR, 4.5 MR and 7 MR respectively. Thereafter, each platen was oriented on the T.M. Long Stretcher substantially as described in the orientation procedure of Example 1 above. Each platen was oriented at 92° C. Thereafter, the resultant oriented films were measured for percent gel and instrumented impact at peak load and energy to break. The results are detailed in Table VII below.

TABLE VII

| EX # | MR | % GEL | INSTRUMENTED IMPACT Peak (lb) |
|---|---|---|---|
| 58 | 0 | 0 | 38 |
| 59 | 3 | 0 | 47 |
| 60 | 4.5 | 32.7 | 42 |
| 61 | 7 | 56.0 | 39 |

Examples 62-65

Four monolayer platens were pressed from samples of Exxon SLP 3011D by the procedure set forth above for Examples 58-61. However, each platen was oriented at 85° C. Test results are shown in Table VIII below.

TABLE VIII

| EX# | MR | % GEL | INSTRUMENTED IMPACT Peak (lb) |
| --- | --- | --- | --- |
| 62 | 0 | 0 | 40 |
| 63 | 3 | 0 | 39 |
| 64 | 4.5 | 23.2 | 42 |
| 65 | 7 | 56.0 | 47 |

Examples 66-73

The films of Examples 58-65 above were tested to determine tensile strength elongation and modulus in both the trans-verse and longitudinal directions. The results are given in Table IX below.

TABLE IX

| Ex# | Film of Ex. # | Tensile (psi) L/T | Elongation (%) L/T | Modulus × 1000 (psi) L/T |
| --- | --- | --- | --- | --- |
| 66 | 58 | 15400/19500 | 115/215 | 21.9/29.5 |
| 67 | 59 | 17300/17700 | 120/200 | 24.7/17.5 |
| 68 | 60 | 16200/20400 | 105/270 | 24.9/27.0 |
| 69 | 61 | 23500/16000 | 150/150 | 17.2/28.8 |
| 70 | 62 | 14800/15000 | 160/210 | 11.1/15.5 |
| 71 | 63 | 20200/10100 | 160/180 | 10.6/14.3 |
| 72 | 64 | 17500/12200 | 140/180 | 13.3/8.4 |
| 73 | 65 | 15000/13000 | 140/190 | 10.3/12.7 |

Example 74

A two layer coextruded precursor film was formed having an inner layer of LD 318.92 from Exxon, EVA-1, and a second layer of Exxon SLP 3010D, a homogeneous ethylene butene copolymer having a density of 0.902 and a 1.0 M.I. The precursor film was irradiated at a dosage of 4.5 MR.

Thereafter, the precursor film was extrusion coated with a barrier layer of a vinylidene chloride methyl acrylate supplied by Dow, and then a layer of EP 4062-3 an ethylene vinyl acetate having 15% vinyl acetate EVA-2 and an abuse layer of EVA-1.

The total structure was oriented out of hot water with a preheat temperature of 195° F. and a hot bath temperature of 188° F. The resultant oriented film had a structure and percent thickness per layer as follows:

| EVA-1/ | SLP 3011D/ | /Saran | /EVA-2 | /EVA-1 |
| --- | --- | --- | --- | --- |
| 14.29% | 51.43% | 9.80 | 16.33% | 8.16 |

Example 75

The procedure set forth in Example 74 was repeated with the exception that the total structure was oriented out of hot water with a preheat temperature of 188° F. and a hot bath temperature of 181° F.

Example 76

The procedure set forth in Example 74 was repeated with the exception that the second layer of the precursor film was Exxon SLP 3011D and the total structure was oriented out of hot water with a preheat temperature of 188° F. and a hot bath temperature of 181° F.

Examples 77-79

The films made by the procedures of Examples 74-76 above were tested for instrumented impact at peak load and energy to break as well as free shrink at 195° F. in both the longitudinal and transverse directions. The results of these tests are given in Table X below.

TABLE X

| Ex. # | Film of Ex. # | Instrumented Impact Peak | Free Shrink L | Free Shrink T |
| --- | --- | --- | --- | --- |
| 77 | 74 | 68.1 | 51 | 63 |
| 78 | 75 | 66.3 | 51 | 63 |
| 79 | 76 | 86.4 | 45 | 56 |

Example 80

A palindromic five layer coextruded film having an A/B/C/B/A structure was oriented out of hot air at 115° C. The skin layers A were each 100% of Exxon SLP 9017, a homogeneous ethylene hexene copolymer having a density of 0.920 g/cc. The internal layers B were each 100% of Dowlex 2045, a heterogeneous ethylene octene copolymer having a density of 0.920 g/cc, supplied by Dow. The core layer C was 100% of PE 1335, an ethylene vinyl acetate having 3.3% vinyl acetate supplied by Rexene. The percent thicknesses of the layers were as follows:

| A | B | C | B | A |
| --- | --- | --- | --- | --- |
| 16.7% | 25% | 16.7% | 25% | 16.7% |

Example 81

A palindromic three layer coextruded film having an A/B/A structure was oriented out of hot air at 113° C. The skin layers A were a blend of 25% by weight of Exxon 3011D, a homogeneous ethylene hexene copolymer having a 0.920 g/cc density, 25% by weight of Dowlex 2037, a heterogeneous ethylene octene copolymer having a density of 0.935 g/cc supplied by Dow, and 50% by weight of Dowlex 2045. The percent thicknesses of the layers were as follows:

| A/ | B/ | A |
| --- | --- | --- |
| 25% | 50% | 25% |

The oriented film had excellent optical properties. However, the slip properties were poor.

Example 82

The procedure of Example 81 was repeated with the exception that the SLP 3011D of the skin layer was replaced with Exxon SLP 3011A, a homogeneous ethylene hexene copolymer having a density of 0.910 g/cc. Here again, the present oriented film had excellent optical properties.

Example 83

The procedure of Example 81 was repeated with the exception that the skin layers A were a blend of 84% by weight of Exxon SLP 0233, a homogeneous ethylene hexene copolymer having a density of 0.922 and 16% by weight of Attane 4202, a heterogeneous ethylene octene copolymer having a density of 0.912 g/cc.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A heat shrinkable film comprising a homogeneous linear single site catalyzed copolymer of ethylene and an alpha-olefin having from six to ten carbon atoms, said copolymer having a density of at least 0.902 g/cc, wherein said heat shrinkable film has been extruded and cooled to its solid state by cascading water, and thereafter heated to its softening temperature and stretched in its machine and transverse directions followed by being quenched, so that said heat shrinkable film will return to its unstretched dimensions when heated.

2. A heat shrinkable film as set forth in claim 1, wherein said homogeneous linear single site catalyzed copolymer is blended with at least one member selected from the group consisting of a thermoplastic homopolymer and a thermoplastic copolymer.

3. A heat shrinkable film as set forth in claim 2, wherein said thermoplastic copolymer of ethylene and an alpha-olefin has from three to ten carbon atoms.

4. A heat shrinkable film as set forth in claim 3, wherein said thermoplastic copolymer is heterogeneous, and has a density below about 0.90 g/cc.

5. A heat shrinkable film as set forth in claim 3, wherein said thermoplastic copolymer is heterogeneous, and has a density above about 0.90 g/cc.

6. A heat shrinkable film as set forth in claim 2, wherein said thermoplastic copolymer comprises a copolymer of ethylene and a second comonomer selected from the group consisting of vinyl acetate, alkyl acrylate, carbon monoxide, butadiene, styrene, acrylic acid, and a metal neutralized salt of an acrylic acid.

7. A heat shrinkable film as set forth in claim 2, wherein said thermoplastic homopolymer comprises a homopolymer of an alpha-olefin.

8. The heat shrinkable film according to claim 2, wherein said film is a multilayer film.

9. The heat shrinkable film according to claim 1, wherein the multilayer film has at least 3 layers.

10. The heat shrinkable film according to claim 9, wherein the homogeneous linear single site catalyzed copolymer is present in an inner layer.

11. The heat shrinkable film according to claim 9, wherein the homogeneous linear single site catalyzed copolymer is present in an outer layer.

12. The heat-shrinkable film according to claim 1, wherein the film has an impact strength of from 56 to 87 pounds.

13. A heat shrinkable film as set forth in claim 1, wherein said homogeneous linear copolymer comprises a copolymer of ethylene and an alpha-olefin having from six to eight carbon atoms.

14. A heat shrinkable film as set forth in claim 13, wherein said homogeneous linear copolymer comprises a copolymer of ethylene and hexene.

15. A heat shrinkable film as set forth in claim 13, wherein said homogeneous linear copolymer comprises a copolymer of ethylene and octene.

16. A heat shrinkable film as set forth in claim 1, wherein said film is a multilayer film and said homogeneous copolymer is present in at least one layer of said multilayer film.

17. The heat shrinkable film as set forth in claim 1, wherein said homogeneous linear copolymer is present in an outer layer.

18. A heat shrinkable film as set forth in claim 17, wherein said outer layer is a heat sealing layer.

19. The heat shrinkable film as set forth in claim 1, wherein said homogeneous linear copolymer is present in an inner layer.

20. A heat shrinkable film having a symmetrical structure comprising:
    outer layers comprising a propylene homopolymer or copolymer; and
    a core layer comprising a homogeneous linear single site catalyzed copolymer of ethylene and an alpha-olefin having from six to eight carbon atoms, said homogeneous copolymer having a density of at least 0.902 g/cc;
    wherein said heat shrinkable film has been extruded and cooled to its solid state by cascading water, and thereafter heated to its softening temperature and stretched in its machine and transverse directions followed by being quenched, so that said heat shrinkable film will return to its unstretched dimensions when heated.

21. A heat shrinkable film as set forth in claim 20, wherein said propylene copolymer comprises a copolymer of from about 100% to about 90% by weight of propylene and from about 0% to about 10% by weight of ethylene.

22. A heat shrinkable multilayer film comprising:
    a heat sealing layer;
    an inner layer comprising a homogeneous linear single site catalyzed copolymer of ethylene and an alpha-olefin having from six to eight carbon atoms, said copolymer having a density of at least 0.902 g/cc; and
    a barrier layer; and
    wherein said heat shrinkable film has been extruded and cooled to its solid state by cascading water, and thereafter heated to its softening temperature and stretched in its machine and transverse directions followed by being quenched, so that said heat shrinkable film will return to its unstretched dimensions when heated.

23. A heat shrinkable multilayer film as set forth in claim 22, wherein said barrier layer comprises a copolymer of vinylidene chloride and methyl acrylate.

24. A heat shrinkable multilayer film as set forth in claim 22, wherein said barrier layer comprises a copolymer of vinylidene chloride and vinyl chloride.

25. A heat shrinkable multilayer film as set forth in claim 22, wherein said barrier layer comprises an ethylene vinyl alcohol copolymer.

26. A heat shrinkable multilayer film as set forth in claim 22, wherein said barrier layer comprises a nylon.

27. A heat shrinkable multilayer film as set forth in claim 22, wherein said heat sealing layer comprises a copolymer of ethylene and a comonomer selected from the group consisting of vinyl acetate, alkyl acrylate, acrylic acid, and a metal neutralized salt of an acrylic acid.

28. A heat shrinkable multilayer film as set forth in claim 22, wherein said heat sealing layer comprises a heterogeneous copolymer of ethylene and an alpha-olefin having from three to ten carbon atoms.

29. A heat shrinkable multilayer film as set forth in claim 22 further comprising an additional layer which is an outer layer.

30. A heat shrinkable multilayer film as set forth in claim 22 further including at least one inner adhesive layer.

31. A heat shrinkable multilayer film comprising:
   a heat sealing layer comprising a homogeneous linear single site catalyzed copolymer of ethylene and an alpha-olefin having from six to eight carbon atoms, said copolymer having a density of at least 0.902 g/cc; and
   a barrier layer; and
   wherein said heat shrinkable film has been extruded and cooled to its solid state by cascading water, and thereafter heated to its softening temperature and stretched in its machine and transverse directions followed by being quenched, so that said heat shrinkable film will return to its unstretched dimensions when heated.

32. A heat shrinkable multilayer film as set forth in claim 31, wherein said barrier layer comprises a copolymer of vinylidene chloride and methyl acrylate.

33. A heat shrinkable multilayer film as set forth in claim 31, wherein said barrier layer comprises a copolymer of vinylidene chloride and vinyl chloride.

34. A heat shrinkable multilayer film as set forth in claim 31, wherein said barrier layer comprises an ethylene vinyl alcohol copolymer.

35. A heat shrinkable multilayer film asset forth in claim 31, wherein said barrier layer comprises a nylon.

36. A heat shrinkable multilayer film as set forth in claim 31, further comprising an additional layer which is an outer layer.

37. A heat shrinkable multilayer film as set forth in claim 31, further including at least one inner adhesive layer.

38. A heat shrinkable film comprising at least two layers wherein at least one of said layers comprises a homogeneous linear single site catalyzed copolymer of ethylene and an alpha-olefin having from six to eight carbon atoms, said copolymer having a density of at least 0.902 g/cc, and wherein at least one of said layers is crosslinked, and wherein said heat shrinkable film has been extruded and cooled to its solid state by cascading water, and thereafter heated to its softening temperature and stretched in its machine and transverse directions followed by being quenched, so that said heat shrinkable film will return to its unstretched dimensions when heated.

39. A heat shrinkable multilayer film having a symmetrical structure comprising:
   outer layers comprising a homogeneous linear single site catalyzed copolymer of ethylene and an alpha-olefin having from six to eight carbon atoms, said copolymer having a density of at least 0.902 g/cc; and
   an inner core layer; and
   wherein said heat shrinkable film has been extruded and cooled to its solid state by cascading water, and thereafter heated to its softening temperature and stretched in its machine and transverse directions followed by being quenched, so that said heat shrinkable film will return to its unstretched dimensions when heated.

40. A heat shrinkable multilayer film as set forth in claim 39, wherein said inner core layer comprises a copolymer of ethylene and at least one comonomer selected from the group consisting of vinyl acetate, alkyl acrylate, acrylic acid, and a metal neutralized salt of an acrylic acid.

41. A heat shrinkable multilayer film as set forth in claim 39, further including two identical inner layers immediately adjacent opposed surfaces of said inner core layer.

42. A heat shrinkable multilayer film as set forth in claim 41, wherein said inner layers comprise a heterogeneous copolymer of ethylene and an alpha-olefin having from three to ten carbon atoms.

43. A heat shrinkable multilayer film as set forth in claim 41, wherein said inner layers comprise a homogeneous single site catalyzed copolymer of ethylene and an alpha-olefin having from three to eight carbon atoms.

44. A heat shrinkable multilayer film as set forth in claim 39, wherein said outer layers further include at least one heterogeneous copolymer of ethylene and an alpha-olefin having from three to ten carbon atoms.

45. A seamless tubing comprising a multilayer, heat shrinkable film comprising a homogeneous linear single site catalyzed copolymer of ethylene and an alpha-olefin having from six to ten carbon atoms, said copolymer having a density of at least 0.902 g/cc, wherein said film has been extruded and cooled to its solid state by cascading water, and thereafter heated to its softening temperature and stretched in its machine and transverse directions followed by being quenched, so that said film will return to its unstretched dimensions when heated.

46. A process for making a heat-shrinkable film, comprising:
   A) extruding a film comprising a homogeneous linear single site catalyzed copolymer of ethylene and an alpha-olefin having from six to ten carbon atoms, said copolymer having a density of at least 0.902 g/cc; and
   B) cooling the film to the solid state by cascading water;
   C) reheating the film to a softening temperature of the homogeneous linear single site catalyzed copolymer;
   D) stretching the film so that an oriented molecular configuration is produced;
   E) quenching the film while substantially retaining its stretched dimensions to set the film in the oriented molecular configuration.

47. The process according to claim 46, wherein the film is reheated to its orientation temperature range by hot water.

48. The process according to claim 46, wherein the step of orienting by stretching is carried out using a trapped bubble.

49. The process according to claim 46, wherein the step of orienting by stretching is carried out using a tenter frame.

50. The process according to claim 46, wherein the film is oriented in both its machine direction and its transverse direction.

51. The process according to claim 46, wherein the film is oriented at a temperature of from 83° C. to 115° C.

52. The process according to claim 46, wherein the film is oriented at a temperature of from 87° C. to 99° C.

53. The process according to claim 46, wherein the film is oriented at a temperature of from 91° C. to 99° C.

54. The process according to claim 46, further comprising irradiating the film after cooling the film to the solid state.

55. The process according to claim 54, comprising irradiating the film after step E.

56. The process according to claim 46, further comprising, between steps B and C, extrusion coating the film with a layer comprising at least one member selected from the group consisting of vinylidene chloride/vinyl chloride copolymer, vinylidene chloride/methyl acrylate copolymer, vinylidene chloride/ethyl acrylate copolymer, and vinylidene chloride/acrylonitrile copolymer.

* * * * *